(12) United States Patent
Thomson

(10) Patent No.: X9640
(45) Date of Patent: May 6, 1836

(54) MEDICINE, BOTANIC

(76) Inventor: Samuel Thomson

Samuel Thomson.
Letters Patent. Dated. (May 6th 1836)
The Schedule referred to in these Letters Patent and making part
of the same, containing a description in the words of the said Samuel
Thomson himself of his Improvements in the System of Botanic Prac-
tice of Medicine.

---

Be it known that I, Samuel Thomson, of Boston in the Coun-
ty of Suffolk and State of Massachusetts, have made certain new
and useful discoveries in preparing medicines and in the mode of
administering the same, to cure diseases, called "Thomsons improved
System of Botanic Practice of Medicine"; which is described
as follows. - Firstly. The mode of preparing an emetic, ^[to be used] in all cases
where the same is necessary; - that is to say in all forms of disease
caused by cold, or obstructed perspiration. Take of the leaves of Lobelia
Inflata, of Linnus, pulverized to a fine powder, from five to twenty grains
in warm water sweetened; - or in a tea of red raspberry leaves; or in
any tea proper for removing canker; the dose is to be repeated until the
desired effect ^[shall] be produced. This preparation is for the less violent
attacks of disease in adults; or for children. - Second. Take of the
seed of the Lobelia, referred to, one pound, finely pulverized, with one
pound of white sugar, the whole to be well pounded together, - the sugar
being designed to absorb the oil; - then add half a pound of the best
capsicum; - quarter of a pound of nerve powder; one gallon [illegible] improved
rheumatic drops as hereinafter described: - Dose - two teaspoonfuls for an
adult in a gill of Myrtle root bark-tea, sweetened; - or in a strong de-
coction of the following compound: namely, 2 lbs of Myrtle root bark,
1 lbs golden seal; 1 lb Ginger; 2 oz Capsicum; 2 oz Cloves, all pulverized
fine and sifted through a fine sieve and well mixed together. For a
dose take a teaspoonful in hot water, sweetened; half this quantity
for a child, and more or less according to age. This also may be used for
the less violent attacks of disease - to be taken warm - the Patient 137 words, 4 Pages.

being in bed with a hot brick or stone wrapped in several thicknesses
of cloth with water or vinegar, placed at the feet. It may be here obser-
ved that steaming by the Inventor's plan is of the utmost importance
in this mode of practice. Injections are also of the utmost importance to
remove canker below the reach of medicine given in the usual way. The
directions to prepare and use the same with steam are to be found in
my "Guide to Health" secured by copyright. Mode of relaxing the muscles
in setting a bone; & in Midwifery. To relax the muscles in setting a bone
let the patient be in bed or shielded from cold air by a blanket, near
the fire; administer a dose of the compound last named. If this does
not produce a perspiration, give a dose of the second preparation of the E-
metic and wrap up the part affected with cloths wet with water as warm
as can be borne; and pour hot water upon the part until the muscles
relax sufficiently. In this way a bone may be set with your thumb and
finger, and with very little trouble to the operator, or pain to the Patient;
whilst by the common method it would require from two to six men caus-
ing the most excruciating pain to the Patient. The same method may be
resorted to in midwifery, or child bed delivery, by taking the medicine as
aforesaid and near the time of delivery let the Patient drink freely of
Raspberry leaf tea with a portion of Emetic number two. Capsicum (see
my Guide to Health) which will hasten or delay the delivery as nature
requires:- then put several diapers or cloths in a kettle of hot water
and have every thing ready that no time may be lost; when the pain
is approaching, apply a cloth as hot as can be borne to slack the muscles
as before described which will abate the pain; as soon as the pain re-
turns change the cloth for another hot one; this will perform that which
nature, or her pains, are striving to accomplish; and by this mode at least
three fourths of the strength of the suffering patient can be preserved, so
much required at this critical period. By maintaining the perspira-
tion after delivery the alarming complaints incident in such cases
will be prevented. — The Patient will be soon restored to her strength and
vigor. In this way the husband can attend to his wife, and she to her neighbors until experience shall preclude the necessity of science.
Anti Dyspeptic Conserve preparation. — Take one pound of the fresh blossoms of
Hollyhock, or of the dry ones moistened to the same consistence of the green; pound
them well together in a mortar; — then add 5 lbs. of White Sugar — pound
until a paste is formed; — then knead or work in with a pestle the following
powder made fine; namely, — 3 lbs of Poplar bark, ½ lb of Golden Seal
¼ lb. of Snake head (balmony) — ½ lb of Cloves, — 2 lb. of Ginger, —
½ lb of Slippery Elm bark, — ½ lb of Capsicum; when it becomes of the con-
sistence of dough then add ½ ounce of oil of pennyroyal well mixed;
then form it into a loaf to dry; or form it into pills. A piece of the Confection
in the pocket, and used as a substitute for tobacco, which may be swal-
lowed with the saliva instead of spitting it off as in the use of that per-
nicious weed, tobacco; — the former will invigorate whilst the latter
will debilitate the system — it will make persons fleshy and strong,
instead of lean and weak; it is a powerful antidyspeptic agent; — it may
be carried in a box or paper and used instead of tobacco. The spring is
the best time to try the beneficial effects of this medicine when the weather is becoming
warm — persons faint — the digestion poor, and the body cold for want of food
and digestive powers to consume it. When this medicine is used the
dyspepsia will cease, because the food is digested or consumed like
the fire in the grate, which keeps up that heat on which the fire in the
grate, and the life in the body depends: here is the cause of consumption, and
here the cure for it.

Anti Dyspeptic Restorative; — Take of the bark of the quaking asp
5 lbs, of Golden Seal 3 lbs; of Bitter herb 1 lb; [illegible] 1 lb; cloves 1 lb; Unicorn 1
lb. cinnamon 1 lb; ginger 3 lbs; capsicum 1 lb, & 13 lbs. of white sugar, all
made fine and well mixed together and put up for use. Dose 1 oz of this
powder to 1 quart of hot water, or a teaspoonful in a tumbler of hot water
sweetened; this is the best mode of using it. For wine bitters one oz of the
powder in a common junk bottle scalded in ½ pint hot water; then fill
the bottle with the best sweet malaga wine & sugar at discretion. — A syrup
for relax or summer complaints. — Take one pound of Poplar bark; 1 lb. of black
cherry bark of the green root; 1 lb. of Bay berry; ½ pound Golden Seal; ½ lb hops - boil and strain off eight gallons, - then add 35 lbs white sugar
scalded; skim it, then add 1 lb cloves when hot and put it in a keg.
When cool add two gallons improved rheumatic drops. Dose for an
adult from [illegible] to 1 wine glass full and repeat at discretion till cured. -
Improved Rheumatic Drops. Take of gum myrrh 1 lb; of Golden Seal [illegible] lb
of Bayberry [illegible] lb; Capsicum 1 oz, the whole to be put in one gallon of [illegible]
high wines or high proof brandy and let it be well shaken together. Dose
from one to [illegible] tea spoonfuls.

What I claim as my discoveries and which I desire to
secure by Letters Patent, are the before described modes of preparing and
administering the above medicines for the purposes herein named

Witnesses.
Septimus S. Cartwright
[illegible] W. Morell.

Samuel Thomson.

(No drawing necessary.)

[illegible]
[illegible] (Rec^d. [illegible] Recorded [illegible] February 27. 1841.) (1371 words)